Oct. 12, 1971

A. J. SCHORR 3,611,786

MEASUREMENT OF THERMAL CONDUCTIVITY
OF HARD CRYSTALLINE BODIES
Filed May 23, 1969

INVENTOR
A. J. SCHORR
BY *H.W. Lockhart*
ATTORNEY

United States Patent Office 3,611,786
Patented Oct. 12, 1971

3,611,786
MEASUREMENT OF THERMAL CONDUCTIVITY OF HARD CRYSTALLINE BODIES
Anthony J. Schorr, Birdsboro, Pa., assignor to Bell Telephone Laboratories, Incorporated, Murray Hill and Berkeley Heights, N.J.
Filed May 23, 1969, Ser. No. 827,197
Int. Cl. G01p 25/18
U.S. Cl. 73—15 R                            1 Claim

ABSTRACT OF THE DISCLOSURE

Determination of the thermal conductivity of an irregularly-shaped body of diamond or other hard crystalline material is made by applying heat to the body at a known input rate from a thermal probe through a low resistance thermal contact of known, relatively small area on the body. The thermal conductivity is a function of the temperature drop as observed through a finite portion of the body, the heat input rate and the radius of the heat input area.

BACKGROUND OF THE INVENTION

This invention relates to measurement of the thermal conductivity of crystalline materials, particularly diamond, which are selected as mounting platforms for semiconductor devices which generate considerable amounts of heat. It is important to select those bodies having the highest thermal conductivity.

In certain semiconductor devices, particularly those of the high frequency or microwave type, considerable amounts of heat are generated per unit area of cross section which must be dissipated to enable continued operation of the device. It has, therefore, been necessary to resort to materials of the highest thermal conductivity as mounting bases for devices of this type.

A particularly suitable material from the standpoint of high thermal conductivity is diamond. Inasmuch as this is an expensive material it is important to select portions of crystals having the highest thermal conductivity. In the past it has been thought that a simple relationship existed between thermal conductivity and the diamond type which is based on optical properties. However, it has been determined that this relationship does not hold and, therefore, classification by type is not entirely suitable for selection of high thermal conductivity diamonds.

Standard thermal conductivity determination techniques heretofore have involved the preparation of precisely shaped specimens. Moreover, it has been found that there is variation in thermal conductivity even within different portions of one large crystal. Accordingly, it is desirable to be able to measure the thermal conductivity of each piece available for use as a mounting base in order to make individual selections. This specimen preparation procedure adds very considerably to the cost of semiconductor device fabrication. A technique which enables facile measurement of each stone is, therefore, an object of this invention.

SUMMARY OF THE INVENTION

In accordance with this invention determination of the thermal conductivity of an irregularly-shaped body of diamond is accomplished by applying heat to the body at a known input rate from a thermal probe through a low resistance thermal contact of a relatively small area of known dimension on the body. The thermal probe is tipped with a material of a hardness equal to that of the specimen and having a tip of known dimensions. This tip is applied using a relatively high stress so as to provide an effective contact area of known dimensions and without the plastic deformation or surface failure of the materials. The thermal probe is arranged to supply a constant known input of heat and the difference in temperature between the heat input area and another spaced apart location on a surface of the specimen is observed. In this configuration the temperature drop through the body is substantially independent of the gross dimensions of the body if the dimensions of the area over which heat is transferred into the body are small compared to the overall dimensions of the body. The thermal conductivity then is a function of this temperature drop, the heat input rate, and the radius of the heat input area.

Thus, a feature of this invention is an apparatus in which hard crystalline bodies may be subjected to a simple procedure which, upon suitable calibration, readily enables a determination of the thermal conductivity of each body.

BRIEF DESCRIPTION OF THE DRAWING

The invention and its other objects and features will be more clearly understood from the following detailed description taken in conjunction with the drawing in which:

In FIG. 1 the body 10 represents a small portion of diamond crystal having upper and lower faces 11 and 13 respectively, which have been ground flat and parallel in preparation for use as a mounting platform for a semiconductor wafer. Typically, such a diamond body may be about 30 mils in thickness between the two parallel faces and have an extreme width also of about 30 mils (1 mil equals .001 inch). The vertical faces 14 and 15 shown have been ground flat for reference purposes but are not essential to the measurement technique in accordance with this invention. The area 12 defined by the small broken line circle with the downward pointing arrows indicates an area in which the thermal probe is to be placed in contact as shown in FIG. 2.

In FIG. 2 a thermal probe 20 rests in pressure contact against the diamond specimen 21. The tip portion 22 of the thermal probe likewise is of diamond material and typically has a 15 mil spherical radius. As indicated by the arrow and letter P the probe is applied against the specimen using considerable stress in order to insure a low resistance thermal contact between the probe and the diamond specimen. Such stress can be produced in a calibrated fashion in a variety of ways known to the art including fixed weights or hydraulic or pneumatic means. Using a tip as described above, an effective contact area of 5 mils radius is formed at a contact stress level of $6 \times 10^6$ lbs. per square inch. This stress level insures low resistance thermal contact without plastic deformation or surface failure.

Figure 1:
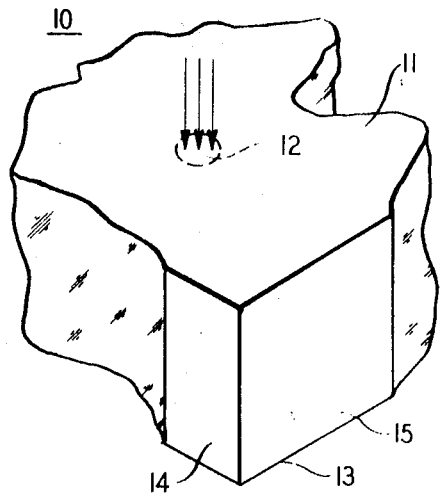
FIG. 1 is an irregularly-shaped body of diamond.

The upper portion 31 of the thermal probe is a thermal insulation section to inhibit heat loss from the upper end of the system. At the mid portion of the thermal probe there is provided a resistance heater winding 27 for supplying heat to balance heat flow up from the tip portion of the probe. The primary heating element 26, also a resistance winding, is a constant power heater injecting heat at a precisely determined rate. Thermocouples 28 and 29 are positioned within a thermal insulation portion 30 and control the heating element 27 to maintain a zero temperature gradient within thermal isolation portion 30, thus assuring a constant rate of heat input to the tip 22. Temperature sensing means 24 and 25 are positioned on each side of the specimen and enable determination of a temperature differential related to the thermal drop through the specimen 21.

This thermal conductivity measurement technique takes advantage of the unique mechanical properties of diamond to reduce the thermal contact resistance between the diamond tipped heat probe and the diamond specimen. The method is based on the thermal resistance arising from the spreading out of the heat from a small source located on a large substrate so that the thermal conductivity of irregularly-shaped stones can be determined from the difference between the temperature observed at the thermocouples 24 and 25. This temperature difference can be considered to be the sum of two components. The first is a drop associated with the apparatus and the contact, which drop should be a constant for a given heat input rate. The second component is the drop through the diamond specimen, which is inversely proportional to the diamond conductivity. For diamond bodies in which the heat input areas are small in comparison to the overall diamond dimensions, the following relationship holds:

$$\Delta T = \frac{Q}{\pi K R}$$

where:

ΔT=the maximum temperature difference,
K=the thermal conductivity,
Q=the heat input rate, and
R=the radius of heat input area.

Thus, it is seen that the thermal conductivity is directly proportional to the heat input rate and inversely proportional to the temperature difference and radius of heat input area.

Figure 2:
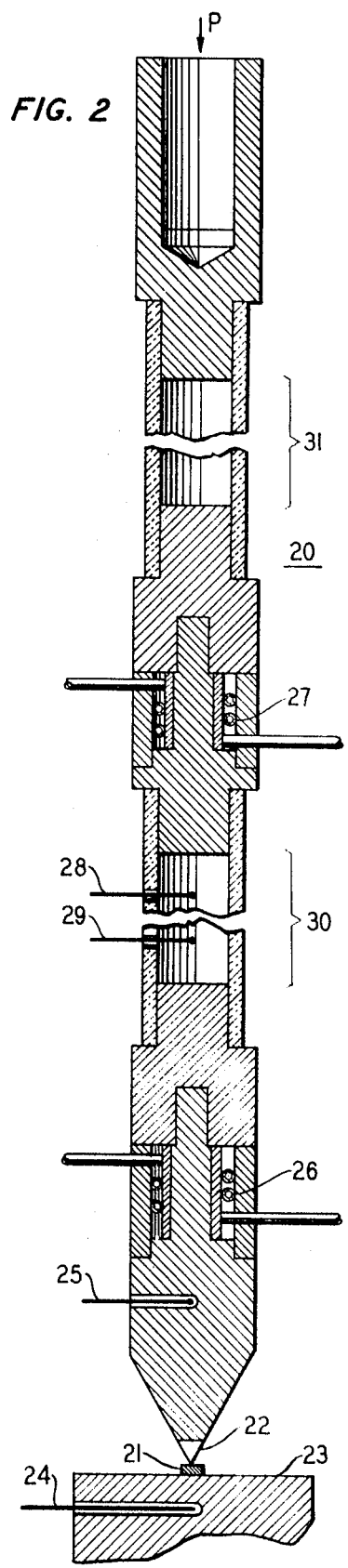
FIG. 2 shows in schematic cross section a thermal probe applied to a specimen for determination of thermal conductivity in accordance with this invention.

In practice the apparatus of FIG. 2 is calibrated by measurements on bodies of known thermal conductivity, thus in effect, determining the component of the temperature drop associated with the apparatus and contact resistance.

Figure 3:
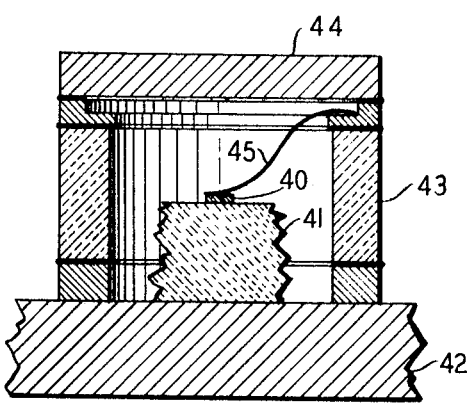
FIG. 3 is a cross section of a typical semiconductor diode mounted on a diamond heat sink and encapsulated for use.

Referring to FIG. 3, a typical microwave diode is shown with the semiconductor element 40 mounted on the diamond heat sink 41. The diamond mounting base in turn is mounted on a large copper base member 42 and the encapsulation is formed of a combination of a ceramic cylinder 43 and a metal cap piece 44. Electrical connection to the upper side of the semiconductor diode is provided by the gold connecting tab 45. Devices of this type are capable of operating at frequencies of in the gHz. range with sufficient power for use in microwave transmission systems. For such applications, thermal conductivities at temperatures of about 100 degrees Kelvin are about 100 watts per degree centimeter.

What is claimed is:

1. A method for determining the thermal conductivity of an irregularly shaped body of hard crystalline material comprising the steps of contacting a relatively small circular area on the surface of said body with a heat input probe under high pressure so as to produce a contact area of known dimensions, injecting heat at a precisely determined rate and observing the temperature difference between the heat input area and a location on the opposite surface of said body spaced apart from said input area, and determining the thermal conductivity of said body, in accordance with the relationship $$K = \frac{Q}{\pi R \Delta T}$$

where K is the thermal conductivity, Q is the heat input rate, ΔT is the maximum temperature difference, and R is the radius of the contact area of the heat input probe.

References Cited

UNITED STATES PATENTS

| 2,475,138 | 7/1949 | Hood, Jr. et al. | 73—15 |
| 3,016,732 | 1/1962 | Hanysz et al. | 73—15 |
| 3,045,473 | 7/1962 | Hager, Jr. | 73—15 |
| 3,266,290 | 8/1966 | Haacke | 73—15 |
| 3,279,239 | 10/1966 | Arends et al. | 73—15 |
| 2,924,771 | 2/1960 | Greenberg et al. | 73—15 |
| 2,951,360 | 9/1960 | Sampson et al. | 73—15 |

RICHARD C. QUEISSER, Primary Examiner

H. GOLDSTEIN, Assistant Examiner